Sept. 12, 1950 G. G. KEYES 2,522,453

SELECTIVE SIGNALING SYSTEM AND APPARATUS

Filed June 14, 1945 5 Sheets-Sheet 1

INVENTOR
GEORGE G. KEYES
BY Emery Robinson
ATTORNEY

SELECTIVE SIGNALING SYSTEM AND APPARATUS

Filed June 14, 1945

5 Sheets-Sheet 2

INVENTOR

GEORGE G. KEYES

BY Emery Robinson

ATTORNEY

Sept. 12, 1950 G. G. KEYES 2,522,453

SELECTIVE SIGNALING SYSTEM AND APPARATUS

Filed June 14, 1945 5 Sheets-Sheet 3

INVENTOR
GEORGE G. KEYES
BY Emery Robinson
ATTORNEY

Sept. 12, 1950 G. G. KEYES 2,522,453

SELECTIVE SIGNALING SYSTEM AND APPARATUS

Filed June 14, 1945 5 Sheets-Sheet 4

INVENTOR
GEORGE G. KEYES

BY Emery Robinson
ATTORNEY

Sept. 12, 1950 G. G. KEYES 2,522,453

SELECTIVE SIGNALING SYSTEM AND APPARATUS

Filed June 14, 1945 5 Sheets-Sheet 5

INVENTOR
GEORGE G. KEYES
BY Emery Robinson
ATTORNEY

Patented Sept. 12, 1950 2,522,453

UNITED STATES PATENT OFFICE 2,522,453

SELECTIVE SIGNALING SYSTEM AND APPARATUS

George G. Keyes, Chicago, Ill., assignor to Teletype Corporation, Chicago, Ill., a corporation of Delaware Application June 14, 1945, Serial No. 599,323

5 Claims. (Cl. 178—4)

This invention relates to printing telegraph systems and more particularly to transmission control systems.

The primary object of the present invention is to provide a sequential selective control system, for gathering previously prepared information, which is entirely automatic when initiated into operation upon the actuation of a single key.

Another object of the invention is to operate previously conditioned transmitters, which are serially connected in a single printing telegraph circuit, in any desired sequence.

Another object of the invention is to provide a transmission control system wherein a centrally located station embraces devices for seizing control of the line circuit and thereafter controlling the order in which a series of stations connected thereto are caused to transmit previously prepared messages to said centrally located station.

Specifically, the present invention provides automatic selective transmission control for use in connection with preliminary collection of weather information over a telegraph communication system. Control of this system is provided by primary sequential control equipment located at one primary switching center or master control station on the loop circuit. The system according to the present invention utilizes selector equipment at each way station, which is always connected to the line and surveys all traffic passing over the line.

A sequence collection transmission on this system starts with the transmission from the primary or central station of a predetermined sequence of characters which includes a two or more letter station identification of the first way station from which transmission is desired. At this point transmission from the primary or central station equipment ceases and the secondary or way station equipment, recognizing the identification letters of its station, starts transmission of the message (for example, weather information) waiting in the form of previously prepared perforated tape. At the conclusion of this message, end-of-message signals in the message tape are transmitted to shut down transmission from the way station and activate the primary or central station equipment to transmit the station identification letters of the next desired way station to be called in. The sequence of transmission of station identification letters at the primary station is contained in a continuous loop of perforated tape. The loop of tape need be changed only when a rearrangement of the order in which station transmission occurs is desired.

In the system according to the present invention it is contemplated that weather information shall be collected hourly at which times transmission of such information, which has been previously prepared on perforated tapes, from each station will occur automatically under the control of the master control station in predetermined order in response to the operation of a switch at the master control station. Pursuant to the operation of said switch the entire sequence collection will take place automatically. As a preliminary to transmission, the primary or master control station equipment opens the line for a predetermined interval to stop any transmitter distributor which may be operating on the circuit. Following this, a so-called sequence collection heading is transmitted from the control tape in the primary (or central station) transmitter distributor. This heading comprises a group of signal codes, which precede each hourly weather sequence collection, which information is included in the afore-mentioned continuous loop of tape; for example, "letters" code, station identification (call letters of the central or master control station), carriage return code, ten line feed signals, S and C character codes (signifying sequence collection), space signal, "circuit of origin" number, space, "date time" group codes, "letters," "carriage return," and "line feed." The foregoing codes control the page printer in the following manner: The "letters" code places the printer in condition to print lower case characters. The station identification letters are then printed on the page, and the carriage return signal returns the carriage to the beginning of line position. The ten line feed signals provide a space between the station heading and the first line of printing. The first characters are S and C meaning sequence collection. Then the circuit of origin number is printed, followed by the date and time when the weather information is taken, after which the printer is conditioned in the unshift position, the carriage is returned to the beginning of line position and the paper is spaced to present the next line of printing preparatory to receiving the weather report from the several way stations. Then the proper condition, select and lock codes of the first way station are transmitted, after which the primary station transmitter distributor stops. The equipment at the selected way station responds to these codes and starts transmission of the data contained in the perforated tape at the way station (for example, the weather information).

At the end of the data (or weather information) transmission, an unlock code is transmitted by the way station. This code stops the transmitter distributor at the outlying or way station and is recognized by the primary or master control unit and its associated relay bank for the purpose of starting the transmission of the actuating codes for the next way station to be called in. In the event of the failure of the called station to transmit the unlock code at the end of transmission of weather information therefrom, or if the selected way station does not respond at the end of a given period of time, an auxiliary distributor at the primary or master control station will transmit a predetermined code signal followed by the unlock code. In this event, the unlock code will activate the primary or master control station equipment in the usual manner to start transmission of the actuating codes for the next way station transmission. This cycle will be repeated until the last selected station has reported, whereupon an appropriate signal is transmitted from the primary or central station, the effect of which is to shut down the apparatus at the central station.

A better understanding of the invention may be had from the following description taken in conjunction with the accompanying drawings, wherein Fig. 1 is a front view of the primary sequential control unit located at the central or master control station;

Figure 1:
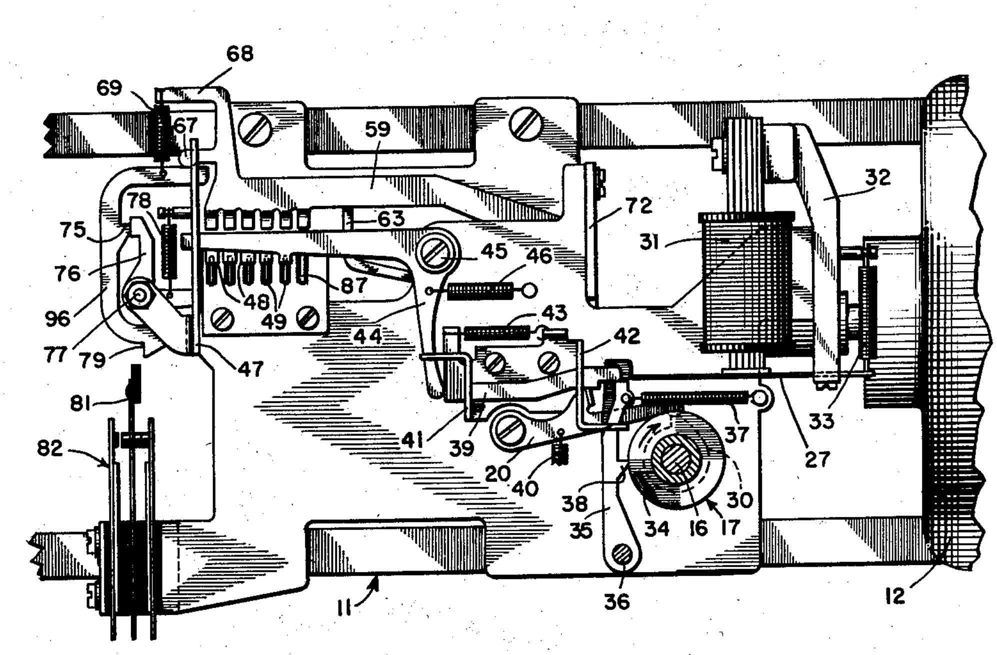

Having reference to Figs. 1 to 4, inclusive, the primary unit comprises a frame 11 which houses and supports the various mechanisms comprising the unit. For example, a motor 12 is suitably supported in the frame 11, and has a pinion 13 secured to the armature shaft 14. Pinion 13 meshes with a gear 15 carried on an operating shaft 16 journaled in the side portions of frame 11. Shaft 16 carries thereon a selector cam member 17, operating cams 18 and 19, eccentric 21 and friction clutches 22 and 23. Friction clutch 23 because of pressure exerted by compression spring 24 tends to rotate the selector cam member 17 but this rotation is prevented by a stop arm 25 which cooperates with a stop disc 26 of the friction clutch 23. Stop arm 25 is carried on the selector magnet armature 27 and operates to release the disc 26 for rotation when the selector magnet armature 27 is released in response to a start impulse, as is well known in the art. The operating cam sleeve 20, carrying cams 18 and 19, and eccentric 21, is released for rotation by a cam projection (not shown) on cam sleeve 17 acting through a trip-off bail identified by the numeric 28, in the manner similar to that shown in Fig. 5 of U. S. Patent No. 1,989,710 issued February 5, 1935, to A. H. Reiber et al. When the bail 28 is operated, it unlatches a stop disc 29, which is a part of friction clutch 22, for a single cycle of rotation.

A selector magnet 31 is mounted on a bracket 32 secured to the main frame 11 and operates the selector armature lever 27 which is pivotally articulated to bracket 32 and is normally biased clockwise (as viewed in Fig. 1) by a spring 33. With normal marking current on the signal line the armature 27 assumes the attracted position shown in Figs. 1 and 2 to thereby hold the selector cam sleeve 17 and the operating cam sleeve 10 against rotation. The cam sleeve 17 is provided with a series of cam notches 34, helically arranged so that upon rotation of cam sleeve 17 a corresponding series of levers 35, pivoted at 36, are selectively actuated sequentially. Levers 35 are normally biased against cam sleeve 17 by individual springs 37. With the armature member 27 in the position shown in Fig. 1, the levers 35 are free to respond to the pull of their individual springs 27 when the projections 38 thereon encounter their respective notches 34. However, if the armature member 27 assumes its released or spacing position due to the de-energization of magnet 31 and pull of spring 33, the levers 35 are blocked against clockwise movement by the end of armature 27 engaging the upper extremity thereof. Of course, it is understood that the member 27 vibrates for every change from marking to spacing position or vice versa.

Associated with each lever 35 is a selector bar 39 which is suitably mounted for sliding motion in comb bars 41 and 42. Bars 39 are normally biased rightwardly against bar 41 by individual springs 43. The right-hand ends of bars 39 normally rest on a pivoted bail member 20, so that immediately following the initiation of rotation of selector cam sleeve 17 the cam 30 releases the bail 20 which then responds to the pull of its spring 40 so that thereafter the right ends of bars 39 rest upon their associated levers 35. Then, when lever 35 is rotated clockwise in response to a marking signal, the end of the associated bar 39 will fall in front of lever 35. When the projection 38 is cammed out of notch 34 as the cam sleeve 17 rotates, the lever 35 will be actuated in a counterclockwise direction to thereby urge the bar 39 associated therewith in a leftward direction, as viewed in Fig. 1.

Cooperatively related to each bar 39 is a bell crank lever 44 pivotally mounted on pivot shaft 45. Each lever 44 is biased counterclockwise by a spring 46 to maintain the lower extremity of its depending arm against the left end of bar 39. The horizontal arms of levers 44 are guided at their extremities by a comb bar 47 and are each provided with a depending projection 48 which cooperates in blocking or latching relation with the ends of a corresponding series of code bars 49, as more clearly shown in Figs. 2 and 4. Each of the code bars 49 are normally biased leftwardly, as viewed in Fig. 4, by an individual spring 51. Thus each code bar 49 tends to bear against the projection 48 of its associated bell crank lever 44.

Figure 3:
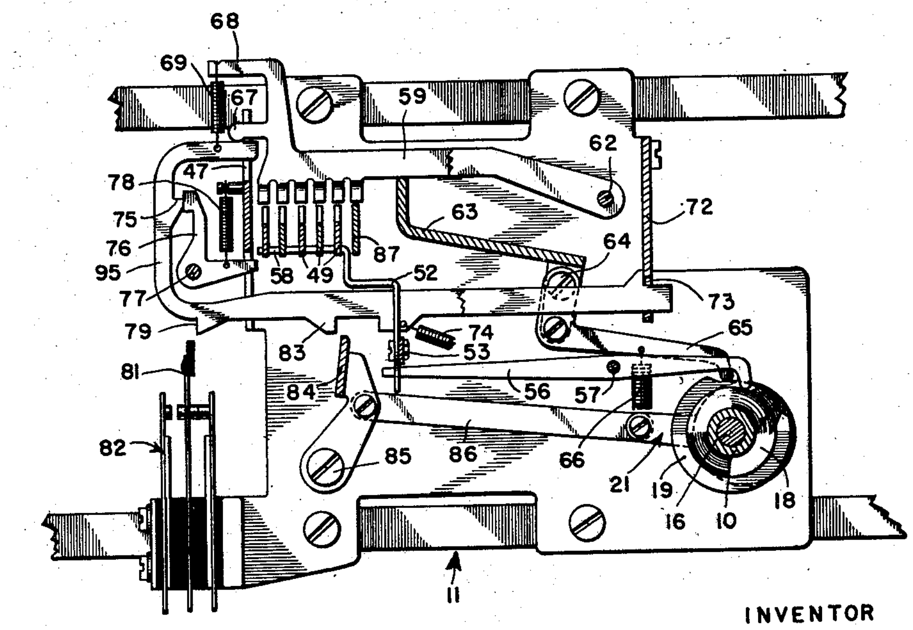
Fig. 3 is a sectional view taken substantially on line 3—3 of Fig. 2.
Figure 2:
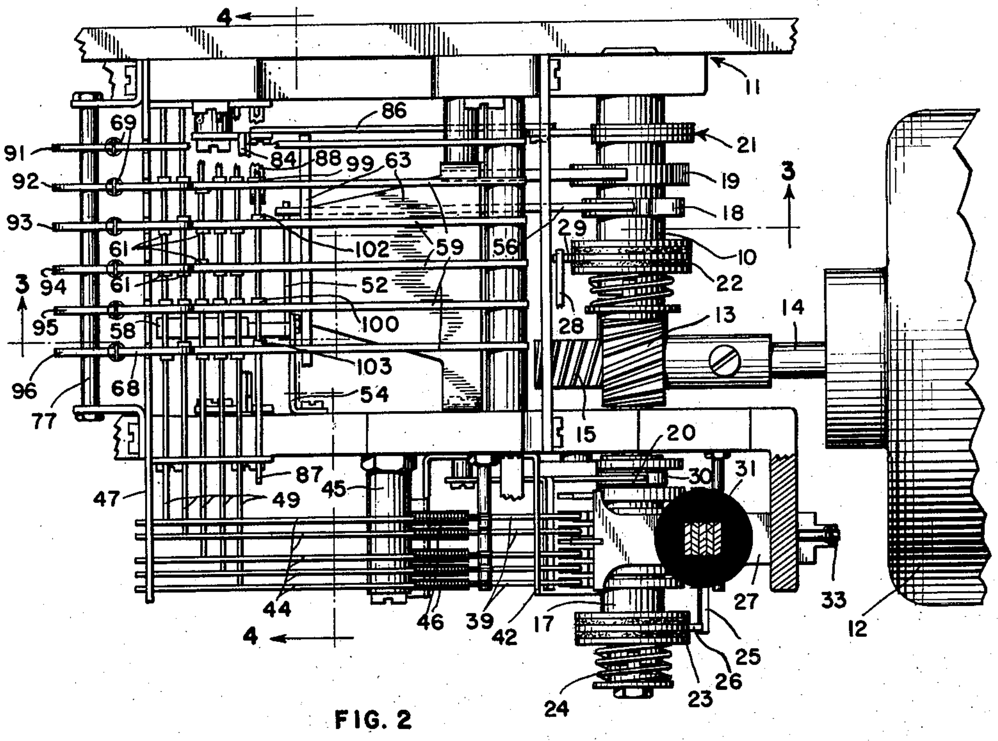
Fig. 2 is a top view of the unit shown in Fig. 1.
Figure 4:
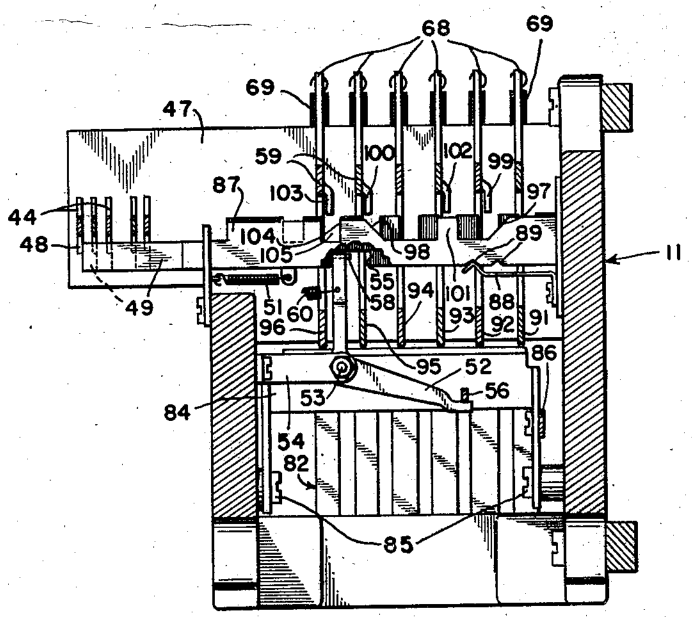
Fig. 4 is a sectional view taken substantially on line 4—4 of Fig. 2.

When the bell cranks 44 are rotated clockwise (as viewed in Fig. 1) in response to a marking impulse received by the selector magnet 31, the code bars 49 will become unlatched from projections 48 and will be actuated leftwardly (as viewed in Fig. 4) by springs 51. A code bar restoring bail 52 is pivoted at 53 (Fig. 4) on a bracket 54 secured to frame 11. Bail 52 is provided with a vertical arm which coacts at its extremity with a notch 55 in the bottom edge of each code bar 49. The horizontal arm of bail 52 bears, at its extremity, underneath the end of a code bar restoring bail operating lever 56 pivoted at 57 (Fig. 3). The opposite end of lever 56 bears against the periphery of the code bar restoring cam 18. A spring 60 acts to bias bail 52 counterclockwise (Fig. 4) to impart clockwise rotation to lever 56 (Fig. 3) to hold the cam follower end thereof against cam 18. Thus, following the selective operation of code bars 49, the cam 18 at the proper time acts to rotate lever 56 counterclockwise (as viewed in Fig. 3) to thereby rotate lever 52 clockwise (as viewed in Fig. 4) to actuate the bail portion 58 thereof rightwardly to carry the code bars 49 correspondingly to effect a latching engagement between the ends of code bars 49 and projections 48 of bell cranks 44.

Code bars 49 are provided along their upper edges with code projections and notches which cooperate with a group of selectable bars 59 superimposed above said code bars. Code bars 49 are provided with projections 61 which are deflected to one side or the other of the code bars in accordance with a predetermined pattern. Selectable bars 59 are pivotally mounted on a pivot shaft 62 and are adapted to rest upon a bail member 63 pivoted at 64. Fixed to bail 63 is a cam follower arm 65 which coacts with the periphery of cam 19, and a spring 66 acting to bias the arm 65 against cam 19. Bars 59 are provided with guide projections 67 which cooperate with slots in the comb bar 47. Bars 59 are further each provided with an extension 68 to which one end of a spring 69 is anchored, the other end of said spring being secured to an associated operating lever 91 to 96.

The operating levers 91 to 96 are pivotally articulated to support 72 through slots 73. Levers 91 to 96 are further guided near their left end (as viewed in Fig. 3) by the comb member 47. An individual spring 74 tends to normally pivot its associated levers 91 to 96 in a counterclockwise direction, which movement is restrained by spring 69 which is stronger than spring 74. In effect, each bar 59 and its associated levers 91 to 96 move as a unit through the instrumentality of spring 69, except as hereinafter set forth. Bars 91 to 96 are each provided with a latching shoulder 75 which cooperates with a latching lever 76, pivoted at 77 and biased normally in a counterclockwise direction by a spring 78.

Levers 91 to 96 are also provided with a shoulder or projection 79 which cooperates with swinger 81 of a make-break contact member 82. These levers are further provided with a shoulder 83 which cooperates with an operating bail 84 pivoted at 85. A link 86 is connected at one end to bail 84 and at the other end to the eccentric 21, so that reciprocating motion is imparted to link 86 by the eccentric 21, to impart in turn, oscillating motion to bail 84.

Associated with the set of code bars 49 is an additional bar 87, which is the shift-unshift code bar. Bar 87 has no normal position, but remains in the position to which it was last moved and is retained in such position by a detent spring 88 (Fig. 4), which cooperates with one or the other of a pair of V-shaped notches 89 formed in the bottom edge of bar 87. Bar 87 is provided with a pair of oppositely inclined surfaces 97 and 98 associated with the shift and unshift bars 92 and 95, respectively. When the unshift bar 95 is selectively operated, the code lug 100 thereon will coact with the inclined surface 98 to cam the bar 87 leftwardly. Conversely, when the shift bar 92 is actuated (after a prior actuation of unshift bar 95) the code lug 99 thereon will coact with inclined surface 97 to actuate the shift bar 87 rightwardly, the detent 88, of course, acting to retain bar 87 in its actuated position.

In the embodiment of the invention shown, the bar 87 is provided with a code lug 101 cooperating with bar 93, and a code notch cooperating with bar 96. In the embodiment shown, both bars 93 and 96 are responsive to the carriage return signal when set up in the code bars 49. However, bar 93 is the lower case carriage return bar, and bar 96 is the upper case carriage return bar. That is, bar 93 will be selected when the shift bar 87 has been first actuated to the unshift or leftward position (as viewed in Fig. 4) to remove projection 101 from beneath the code lug 102 of bar 93, and to cause the code lug 103 of bar 96 to be blocked by the projection 104 adjacent to notch 105 of bar 87. On the other hand, the upper case carriage return bar 96 will be selectively operated when the shift control bar 87 has been first moved rightwardly in response to the unshift or "letters" code signal, to bring code notch 105 beneath the code lug 103, and the lug or projection 101 in blocking relation with code lug 102.

In the operation of the structure shown in Figs. 1 to 4, the code signal impulses are received by the selector magnet 31 in well known manner, the marking impulses attracting and holding the armature 27 and the spacing impulses releasing said armature. Since the normal stop condition of the signal line is a marking condition (current on the line) the magnet 31 will be energized and the armature 27 will be held attracted to thereby hold arm 25 thereof in blocking engagement with stop disc 26, to thus hold the operating elements on shaft 16 against rotation. Upon receipt of a start signal impulse (which is of spacing nature) the magnet 31 will be de-energized thus releasing its armature 27 to initiate rotation of the operating elements on shaft 16.

During the code signal cycle the armature 27 will act to block clockwise movement of levers 35 in response to spacing signals, and will permit rotation of levers 35 in response to marking signals. If the signal impulse is of marking nature, the lever 35 will move to the right and bar 39 fall off the top of said lever to thereby be operated leftwardly by the lever 35 when the latter is cammed out of notch 34. The leftward movement of bar 39 will act to rotate its bell crank 44 clockwise to unlatch its associated code bar 49. After the five code bars 49 have been thus released or not released depending upon whether the signal impulse was of a marking or spacing nature, a cam or sleeve 17 acts through clutch trip member 28 to release the sleeve 10 for rotation.

As the sleeve 10 begins its rotation, the cam 19 causes the bail 63 to be released to permit the bars 59 to sense the code bars 49. The bar 59 which finds an alignment of notches will be actuated further than the rest of the bars 59 by spring 74 to bring shoulder 79 into the path of the swinger 81. Also, shoulder 75 becomes engaged by its associated latch lever 76 to hold the selected lever 91—96 in its selected position until its associated contact 82 has been operated. All of the bars 59 are returned by bail 63 to their vertical position. The spring 69 of the selected bar 91—96 will be stretched since its associated bar cannot be returned until it has become unlatched, as will presently appear. With the selected lever 91—96 thus latched, the operating bail 84 is actuated, through link 86, by the eccentric 21. As the bail 84 is operated counterclockwise, it will engage the shoulder 83 of the selected bar 91—96 to thereby actuate the selected bar leftwardly, thus causing shoulder 79 thereof to operate swinger 81 and associated contacts. In its leftward movement, the shoulder 75 of the selected bar 91—96 becomes disengaged from the latch 76 to permit the selected bar to respond to the pull of its spring 69 to be returned to its upward position. Following the operation of bail 63 to return the bars 59 to the normal uppermost position, the cam 19 functions through levers 56 and 52 to return the code bars 49 to their unselected position whereat they are again latched by bell crank levers 44.

Figure 5:
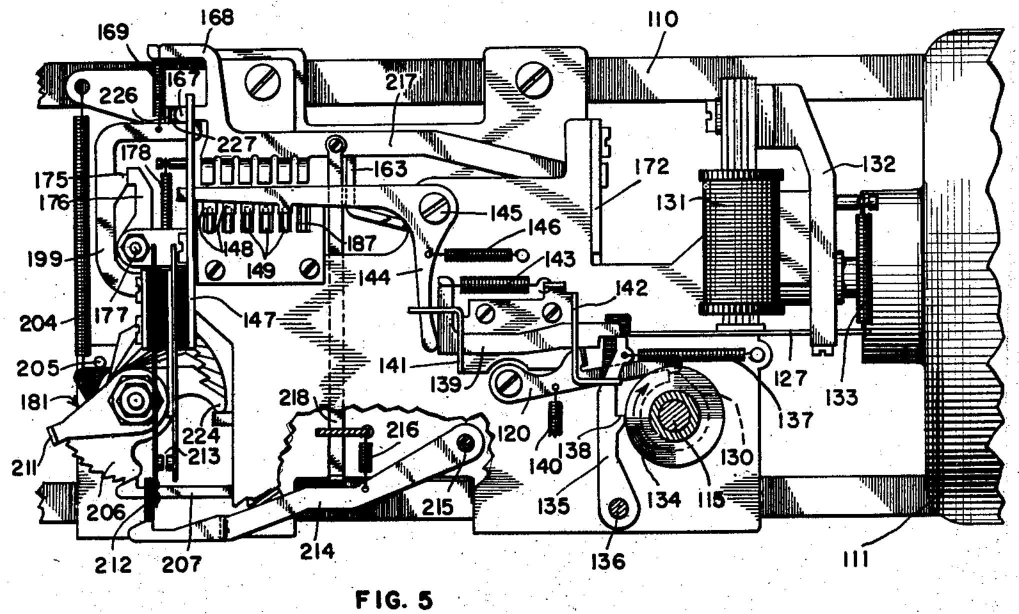
Fig. 5 is a front view of the control apparatus located at each of the way stations of a loop circuit.
Figures 7, 11:
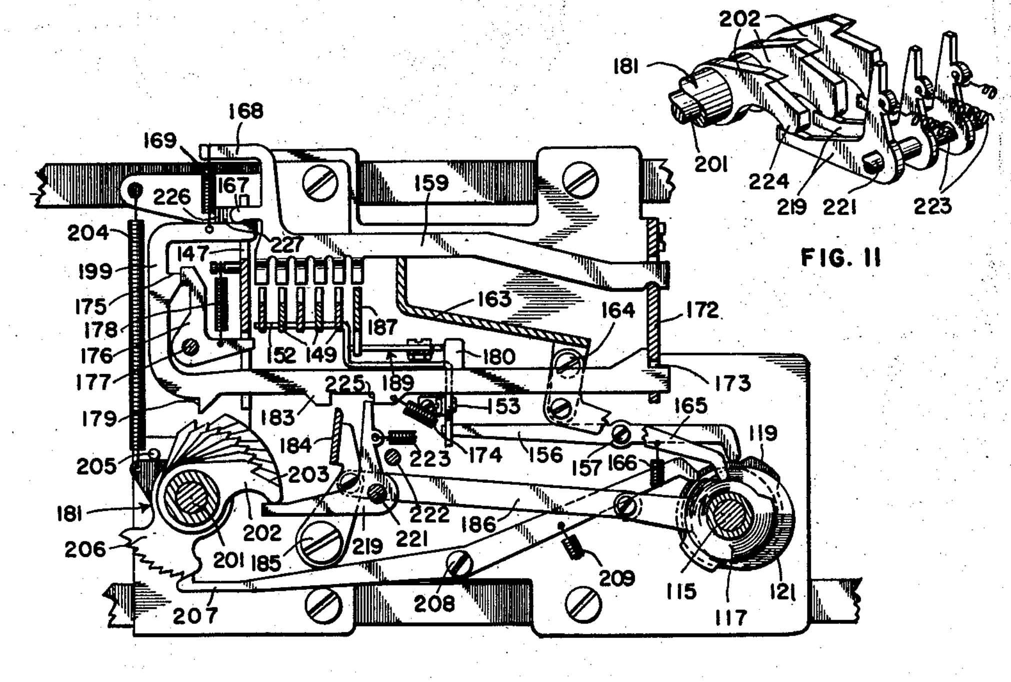
Fig. 7 is a sectional view taken substantially on line 7—7 of Fig. 6.
Fig. 11 is a fragmentary perspective view showing the relationship between the contact controlling ratchet assembly and the cutout levers.
Figures 6, 9, 10:
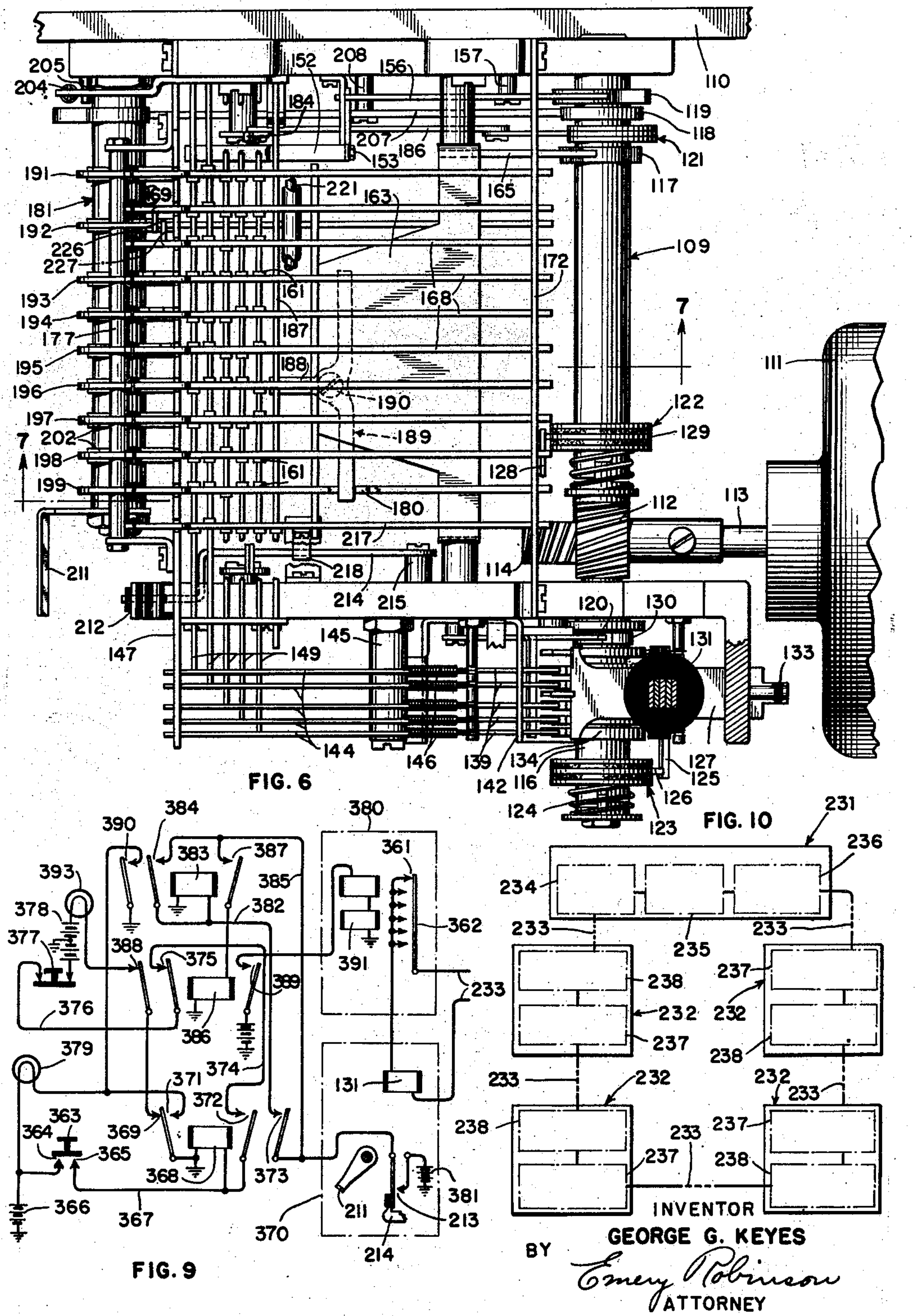
Fig. 6 is a top view of apparatus shown in Fig. 5.
Fig. 9 is an electrical circuit diagram for the way station.
Fig. 10 is a diagram of the loop circuit embodying the arrangement according to the present invention.

In Figs. 5, 6, and 7 are illustrated the control apparatus that is located at each of the way stations in the loop circuit embracing the sequential control system according to the present invention. This apparatus, which is similar in many respects to the primary apparatus shown in Figs. 1 to 4, comprises a main frame 110 which houses and supports the various mechanisms comprising the unit. The frame 110 supports a motor 111 which has a pinion 112 secured to the armature shaft 113. The pinion 112 meshes with a gear 114 carried on an operating shaft 115 journaled in the side portions of frame 110. Shaft 115 carries thereon a selector cam member 116, operating cams 117, 118, and 119, eccentric 121 and friction clutches 122 and 123. Friction clutch 123 because of pressure exerted by compression spring 124 tends to rotate the selector cam member 116 but this rotation is prevented by a stop arm 125 which cooperates with a stop disc 126 of the friction clutch 123. Stop arm 125 is carried on the selector magnet armature 127 and operates to release the disc 126 and clutch 123 for rotation when the selector magnet armature 127 is released in response to a start impulse, as is well known in the art. The operating cam sleeve 109 carrying cams 117, 118, and 119, and eccentric 121 is released for rotation by a cam projection (not shown) on cam sleeve 116 acting through a trip-off bail identified by the numeric 128, in the manner similar to that shown in Fig. 5 of U. S. Patent No. 1,989,710. When the bail 128 is operated, it unlatches a stop disc 129, which is a part of friction clutch 122, for a single cycle of rotation.

A selector magnet 131 is mounted on a bracket 132 secured to the main frame 110 and operates the selector armature lever 127 which is pivotally articulated to bracket 132 and is normally biased clockwise (as viewed in Fig. 5) by a spring 133. With normal marking current on the signal line the armature 127 assumes the attracted position shown in Fig. 5, to thereby hold the selector cam sleeve 116 and the operating cam sleeve 109 against rotation. The cam sleeve 116 is provided with a series of cam notches 134, helically arranged so that upon rotation of cam sleeve 116 a corresponding series of levers 135, pivoted at 136, are selectively actuated sequentially. Levers 135 are normally biased against cam sleeve 116 by individual springs 137. With the armature member 127 in the position shown in Fig. 5, the levers 135 are free to respond to the pull of their individual springs 137 when the projections 138 thereon encounter their respective notches 134. However, if the armature member 127 assumes its released or spacing position due to the de-energization of magnet 131 and pull of spring 133, the levers 135 are blocked against clockwise movement by the end of the armature. Of course, it is understood that the member 127 vibrates for every change from marking to spacing position or vice versa.

Associated with each lever 135 is a selector bar 139 which is suitably mounted for sliding motion in comb bars 141 and 142. Bars 139 are normally biased rightwardly against bar 141 by individual springs 143. The right-hand end of bars 139 normally rest on a pivoted bail member 120, so that immediately following the invitation of rotation of selector cam sleeve 116 the cam 130 releases the bail 120 which then responds to the pull of its spring 140 so that thereafter the right ends of bars 139 rest upon their associated levers 135. Then, when lever 135 is rotated clockwise, in response to a marking signal, the end of the associated bar 139 will fall in front of lever 135. When the projection 138 is cammed out of notch 134 as the cam sleeve 116 rotates, the lever 135 will be actuated in a counterclockwise direction to thereby urge the bar 139 associated therewith in a leftward direction, Fig. 5.

Cooperatively related to each bar 139 is a bell crank lever 144 pivotally mounted on pivot shaft 145. Each lever 144 is biased counterclockwise by a spring 146 to maintain the lower extremity of its depending arm against the left end of bar 139. The horizontal arms of levers 144 are guided at their extremities by a comb bar 147 and are each provided with a depending projection 148 which cooperates in blocking or latching relation with the ends of a corresponding series of code bars 149. Each of the code bars 149 are normally biased in the manner shown in Fig. 4, by an individual spring (not shown). Thus each code bar 149 tends to bear against the projection 48 of its associated bell crank lever 144.

When the bell cranks 144 are rotated clockwise (as viewed in Fig. 5) in response to a marking impulse received by the selector magnet 131, the code bars 149 will become unlatched by projection 148 and will be actuated downwardly (as viewed in Fig. 6) by their springs similar to springs 51. A code bar restoring bail 152 is pivoted at 153 (Fig. 7) on a bracket (not shown) secured to frame 110. Bail 152 is provided with a vertical arm which coacts at its extremity with a notch (not shown) in the bottom edge of each code bar 149 in a manner similar to the primary unit previously described. The horizontal arm of bail 152 bears, at its extremity, underneath the end of a code bar restoring bail operating lever 156 pivoted at 157 (Figs. 6 and 7). The opposite end of lever 156 bears against the periphery of the code bar restoring cam 119. A spring (not shown) acts to bias lever 152 to impart clockwise rotation to lever 156 (Fig. 7) to hold the cam follower end thereof against cam 119. Thus, following the selective operation of code bars 149, the cam 119 at the proper time acts to rotate lever 156 counterclockwise (as viewed in Fig. 7) to thereby rotate lever 152 to actuate the bail portion thereof to carry the code bars 149 correspondingly to effect a latching engagement between the ends of code bars 149 and projections 148 of bell cranks 144.

Code bars 149 are provided along their upper edges with code projections and notches which cooperate with a group of selectable bars 159 superimposed above said code bars. Code bars 149 are provided with projections 161 which are deflected to one side or the other of the code bars in accordance with a predetermined pattern. Selectable bars 159 are pivotally articulated to support 172 and are adapted to rest upon a bail member 163 pivoted at 164. Fixed to bail 163 is a cam follower arm 165 which coacts with the periphery of cam 117, a spring 166 acting to bias the arm 165 against cam 117. Bars 159 are provided with guide projections 167 which cooperate with slots in the comb bar 147. Bars 159 are further each provided with an extension 168 to which one end of a spring 169 is anchored, the other end of said spring being secured to an associated operating lever 191 to 199.

The operating levers 191 to 199 are pivotally articulated to support 172 through slots 173. Levers 191 to 199 are further guided near their left end (as viewed in Fig. 7) by the comb member 147. An individual spring 174 tends to pivot its associated lever 191 to 199 normally in a counterclockwise direction, which movement is restrained by spring 169 which is stronger than spring 174. In effect, bar 159 and a lever 191 to 199 move as a unit through the instrumentality of spring 169, except as hereinafter set forth. Bars 191 to 199 are each provided with a latching shoulder 175 which cooperates with a latching lever 176, pivoted at 177 and biased normally in a counterclockwise direction by a spring 178.

Levers 191 to 199 are also provided with a shoulder 179 which cooperates with a contact controlling ratchet assembly 181 in a manner which will hereinafter appear. These levers are further provided with a shoulder 183 which cooperates with an operating bail 184 pivoted at 185. A link 186 is connected at one end to bail 184 and at the other end to an eccentric 121, to impart in turn, oscillating motion to bail 184.

Associated with the set of code bars 149 is an additional bar 187, which is the shift-unshift code bar. Bar 187 has no normal position, but remains in the position to which it was last moved, and is retained in such position by a detent spring similar to spring 88 shown in Fig. 4. Bar 187 is provided on its bottom edge with a slot which receives the stem portion 188 of a T-shaped lever 189 pivoted at 190. One arm of T-lever 189 cooperates with a projection 130 on lever 199 and the other arm is similarly related to lever 193 (Figs. 6 and 7). In the embodiment disclosed, lever 193 is the "letters" or unshift lever and lever 199 is the "figures" or shift lever. When the lever 193 is actuated leftwardly (Fig. 6) in a manner presently set forth the lever 189 will be rotated counterclockwise about pivot 190 to impart forward movement (downward in Fig. 6) to the shift-unshift bar 187. On the other hand, if the lever 199 is actuated leftwardly, the lever 189 will be rotated clockwise to impart rearward movement to the bar 187.

The ratchet assembly 181 is revolvably carried on a shaft 201 suitably journaled in the frame 110 and is provided with a helical arrangement of arms 202, one arm 202 being provided for each lever 191 to 199. Each arm 202 terminates in a ratchet tooth conformation and an inclined cam surface 203. A spring 204 tends to rotate the ratchet assembly 181 in a clockwise direction and to return the assembly 181 against a stop 205 mounted on the frame 110. The ratchet assembly 181 is also provided with a ratchet segment 206 which cooperates with a detent pawl 207 pivotally mounted at 208 to frame 110. Pawl 207 is normally biased in a clockwise direction (as viewed in Fig. 7) by a spring 209 to cause the cam follower portion thereof to ride on the periphery of cam 118.

Also carried on the ratchet assembly 181 is a contact operating arm 211 (Figs. 5 and 6) which cooperates with the insulated portion 212 of a pair of contacts 213 suitably mounted on comb plate 147. Cooperating with the insulated portion 212 of contacts 213 is a locking member 214 pivoted at 215. Member 214 is normally biased in a clockwise direction by a spring 216 so that when the arm 211 has been rotated or stepped in a counterclockwise direction, in the manner presently set forth, until it closes the contacts 213, the insulated portion 212 will become latched by the member 214 to hold the contacts 213 closed, while the ratchet assembly 181 (and arm 211) is returned to its position against the stop 205.

In response to a predetermined code signal the bar 217 (similar to bars 159) will be selectively operated. Therefore, as the bar 217 is thus activated counterclockwise due to the presence of an alignment of notches therefor in the set of code bars 149, a member 218 pivoted thereto and depending therefrom will depress the lever 214 to release it from latching engagement with the portion 212 of contact 213.

As shown in Figs. 7 and 11, the ratchet assembly 181 also cooperates, through each of its arms 202, with a corresponding series of cutout levers 219 pivoted on a rod 221, so that when the assembly 181 is returned to its extreme clockwise position against stop 205, each arm 202 will contact the horizontal arm of its associated lever 219, to hold the levers 219 in the position shown in Fig. 7 away from the common stop pin 222 and against the pull of individual springs 223.

In the operation of the unit shown in Figs. 5, 6, 7, and 11, the shaft 115 is constantly rotating, and the sleeves 116 and 120 thereon are, through the yielding attributes of friction clutches 122 and 123, held in their stop positions by stop elements 125 and 128, respectively. Insofar as the selector mechanism of this unit is substantially similar to that of the embodiment shown in Figs. 1 to 4, the operation thereof will be described only briefly. As the code signal impulses are received by the selector magnet 131, the start signal initiates rotation of the selector cam sleeve 116 which, through the cooperation of levers 135 and armature lever 127, may or may not actuate bars 139 leftwardly to impart counterclockwise rotation to bell crank levers 144 to unlatch the code bars 149 to establish an alignment of notches corresponding to the received signal, to effect the selective operation of a lever 159.

Upon the selection of a lever 159, its associated lever 191 to 199 is operated simultaneously therewith by the spring 174 individual thereto and by the projection 167, to cause the selected lever 191 to 199 to become latched up by the coaction of latching pawl 176 with shoulder 175. Now, if the lever 191 has been selected, its shoulder 179 will become aligned with the tooth on the first (or upper) arm 202 so that when lever 191 is actuated leftwardly (as viewed in Fig. 7) by the bail 184, the ratchet assembly 181 is rotated or stepped a unit distance angularly and held thereat by the detent pawl 207 cooperating with ratchet segment 206. As the assembly 181 rotates in this manner the extremities 224 (Fig. 11) recede from the horizontal arms of cutout levers 219 so that as the lever 191 is returned to its rightward position by its spring 174 (following the return of bail 184 to its clockwise position) the projection or shoulder 179 of the returned lever 191 will ride up the slope 203 of the arm 202 associated with lever 191, whereupon shoulder 225 of lever 191 will be lifted clear of the vertical arm of cutoff lever 219 thus permitting lever 219 to be rotated by its spring 223 against stop 222, thus causing lever 219 to support lever 191. In this manner, the selected lever 191 will be held inoperative or nonresponsive to further selection until the ratchet assembly 181 shall have first been returned to its clockwise position against stop 205 at which time the extremities of arms 202 urge the levers 219 counterclockwise away from stop 222 and free of shoulders 225.

To cause the arm 211 to close the contact 213 the levers 191 to 199 must be operated in consecutive order to properly step the ratchet assembly 181 counterclockwise. During the stepping operation, while the shoulder 179 is still in engagement with an arm 202, the pawl 207 will be disengaged from ratchet segment 206 momentarily by cam 118, but will become re-engaged before shoulder 179 is again released from arm 202. The purpose for this is to insure a proper stepping action and still permit the return of the ratchet assembly 181 to its clockwise position against stop 205 in the event that the levers 191 to 199 do not follow each other in consecutive order. The codes for each of the levers 191 to 199 are so chosen as to agree with a predetermined group of code signals assigned to the particular unit at each way station so that when a sequence of code signals agreeing with a predetermined group is applied to the signal line the ratchet assembly 181 at the station identified by the predetermined group will be rotated so that its contact arm 211 will close its associated contact 213 and become locked by detent lever 214. However, should any code signal included in the predetermined group be missing, the assembly 181 will be stepped until one of the codes in the group disagrees with the assigned code, whereupon the assembly 181 will be returned to its position against the stop 205.

It will be observed that lever 192 (Fig. 6) is controlled by two of the bars 159, which bars are provided with laterally directed portions 226 and 227 superimposed above and in cooperative engagement with lever 192.

Figure 8:
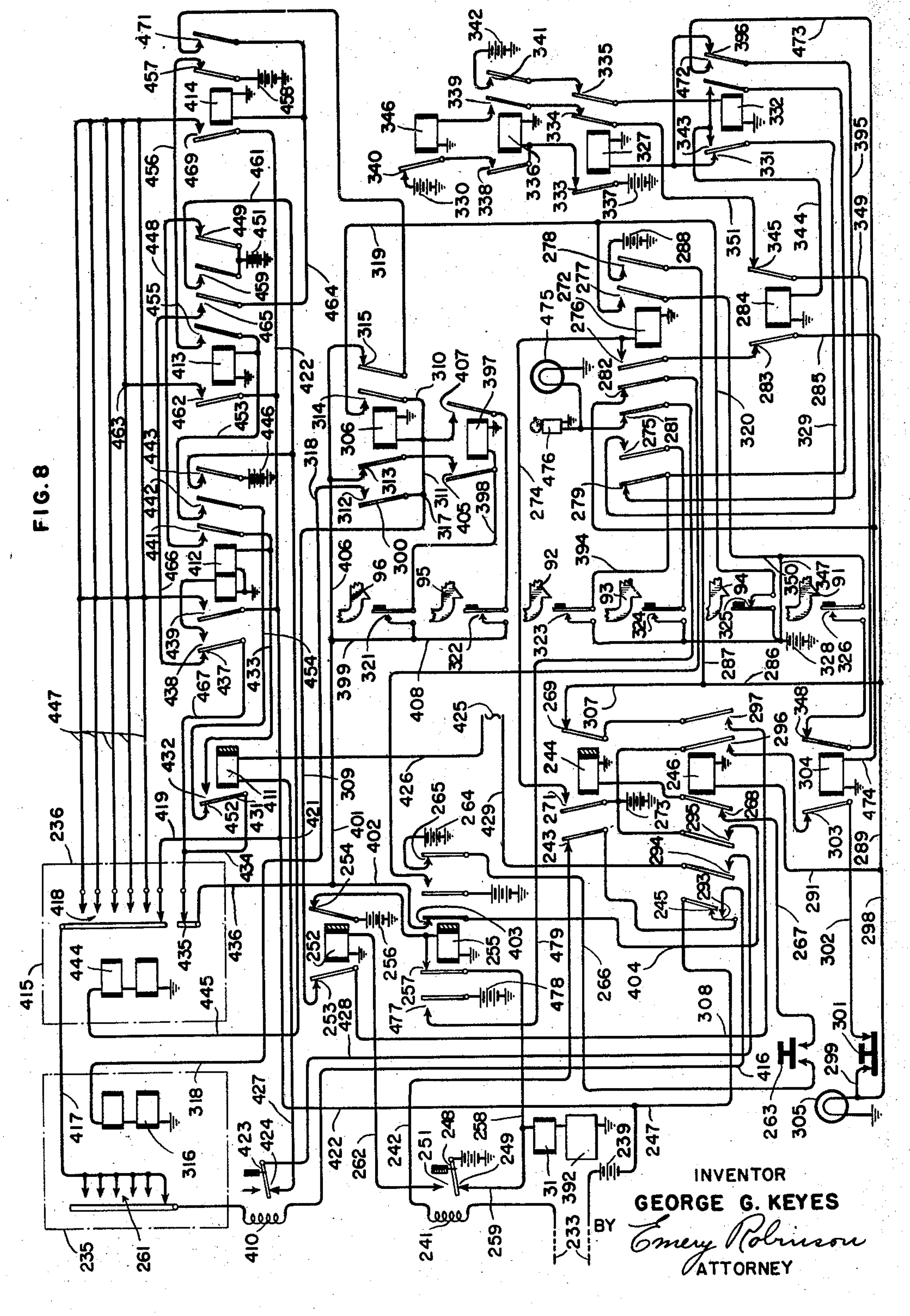
Fig. 8 is a schematic diagram of the electrical circuit at the central or master control station.

Having reference to Fig. 10, a diagram of a loop circuit comprising a central or master control station 231 and a plurality of way stations 232 connected serially by a signal line 233 is shown. There may be 75 or more way stations in the loop circuit. The central station, in addition to the electrical relay arrangement shown in Fig. 8, is provided with the apparatus disclosed in Figs. 1 to 4, which is identified as 234 in Fig. 10. Also included in the central station circuit are two tape transmitter units 235 and 236 which are of the construction shown in U. S. Patent No. 2,296,845, issued September 29, 1942, to M. T. Goetz. At the way stations 232 the system comprises, in addition to the relay arrangement shown in Fig. 9, the apparatus shown in Figs. 5, 6, 7, and 11, which is identified as 237 in Fig. 10. There is also included in the way station circuit a tape transmitter 238 similar to units 235 and 236.

Referring now to Fig. 8, the signal line 233 is indicated as deriving its signal current from battery 239. At the central station the line circuit extends from the "in" side, through line relay 241, over conductor 242, through contact 243 (now closed) of line-break timing relay 244, through make-before-break contact 245 (now closed) of relay 246, over conductor 247 to grounded battery 239. With marking current on the line, the armature 248 of relay 241 will be held against its marking contact 249. Since the spacing contact 251 of relay 241 is open at this time, the circuit for slow-to-release relay 252 will be broken and relay 252 will be unenergized. In this condition of relay 252, the armatures thereof will be released to close contacts 253 and 254. With the contact 254 thus closed an energizing circuit is completed for a slow-to-release relay 255 from grounded battery 256, through contact 254, then through the winding of relay 255 to ground. Relay 255 is locked up over a circuit extending from ground, through the winding of relay 255, through contact 257 of relay 255, over conductors 258 and 259, through contact 249 (now closed), and through armature 248 to battery.

Preparatory to sequential message collection a continuous loop of tape is prepared having perforated therein, in addition to the "sequence collection heading" group of code signals mentioned previously, groups of code signals, each group pertaining to a particular way station, and said groups arranged in the order in which it is desired to call in the way stations. The loop of tape need be changed only when a rearrangement of the order in which station transmission occurs is desired. Each group of code signals pertaining to a particular way station comprises conditioning codes followed by the station identification letters of the way station from which transmission is desired followed by further conditioning codes. For example, in the system according to the present invention, such a group of code signals would comprise the following codes: Carriage return, carriage return, "letters" or unshift, A, B, C (or other station identification characters), space and "letters."

The loop of tape just mentioned is properly inserted in the tape transmitter 235 with the sequence collection heading group of code signals properly adjusted with respect to the transmitting contacts 261. The signal line is then opened for a predetermined interval of time by closing the sequence collection key 263 to energize a line opening relay, as will hereinafter appear. The open line condition is employed to shut down any transmitter distributor that might be transmitting on the line at the time the sequence collection is due to begin. At the master or control station the slow-to-release relay 252 of a dual (or line controlled) relay means comprising relays 252 and 255 becomes energized over a circuit extending from ground through the winding of relay 252, over conductor 262, through contact 251 and over armature 248 to grounded battery. Thus, the armatures of relay 252 are attracted, thereby opening contacts 253 and 254. Upon opening contact 254, the energizing circuit for relay 255 is broken, but relay 255 being of the slow-to-release type its armatures will still remain attracted.

Also, upon the operation or closure of the sequence collection key 263, a circuit will be completed from battery 264, through contact 265 of relay 255, over conductor 266, through key 263, over conductor 267, through contact 268 of relay 246, then through the winding of relay 244 to ground. Upon the energization of relay 244, its contacts 243 and 269 will open, and its contact 271 will close. Upon the closing of contact 271, a circuit will be completed for relay 272 from battery 273, through contact 271, over conductor 274, then through the winding of relay 272 to ground. The energization of relay 272 will effect the closing of contacts 275, 276, 277, and 278, and the opening of contacts 279, 281, and 282. The relay 272 will become locked up over a circuit extending from ground, through the winding of relay 272, through contact 276 thereof, then through contact 283 of relay 284, over conductors 285, 286, and 287, then through contact 278 (now closed) of relay 272 to battery 288. A lamp 305 will become illuminated upon the closing of a circuit from battery 288, through contact 278, over conductors 287, 286, 289, and 298, then through lamp 305 to ground. The lighting of lamp 305 is a signal that the sequential control system is in operation.

When relay 272 is energized as just described, a circuit will be established for energizing the relay 246 from battery 288, through contact 278, over conductors 287, 286, 289, and 291, then through the winding of relay 246 to ground. Relay 246, when thus energized, will close its contacts 293, 294, 295, 296, and 297, and open its contacts 245 and 268. Relay 246 will then become locked up over a circuit extending from ground, through the winding of relay 246, over conductors 291, 298, and 299, through key 301, over conductor 302, through contact 303 (now closed) of relay 304, through contact 296 (now closed) of relay 246 and then to battery 273. A circuit is also completed from battery 273, through contacts 296 and 303, over conductor 302, through key 301, over conductor 299 and through lamp 305 to ground to maintain lamp 305 illuminated.

Upon the opening of contact 268, the energizing circuit for slow-to-release line-break timing relay 244 is broken, so that when, after a predetermined interval of time, the relay 244 releases and closes its contact 243 to close the line circuit which will extend from the "in" side of the line 233, through the winding of line relay 241, over conductor 242, through contact 243, through make-before-break contact 293 of relay 246, over conductor 416, through the winding of relay 410, through the stop contact of transmitting contacts 261, over conductor 417, through contacts 418, over conductors 419 and 422 to the "out" side of line 233. Thus, marking current is again applied to the signal line 233, whereupon armature 248 of line relay 241 is actuated to the marking side to close contact 249. The circuit for relay 252 will thus be broken but relay 252 being slow-to-release will not release immediately. However, when relay 252 releases, the relay 255 will again become energized over the previously described circuit through contact 254 of relay 252. When relay 252 releases, its contact 253 will complete an energizing circuit for a primary control relay 306 from battery 288, through contact 278 (now closed) of relay 272, over conductors 287 and 307, through contact 269 (now closed) of relay 244, through contact 297 (now closed) of relay 246, over conductor 308, through contact 253 (now closed) of relay 252, over conductor 309 and 311, then through the winding of relay 306 to ground. Relay 306, upon energizing, closes its contacts 312 and 314, and opens its contacts 313 and 315. The closure of contact 314 completes a locking circuit for relay 306 from ground, through the winding of relay 306, over conductor 310, through contact 314 (now closed), over conductors 319 and 320, and through contact 325 (normally closed) to battery 328. Upon the closure of contact 312 an energizing circuit for clutch magnet 316 of transmitter unit 261 is completed from battery 288 over the afore-mentioned energizing circuit for relay 306 to junction 317, thence through contact 312 (now closed), over conductor 318 and through the winding of clutch magnet 316 to ground. By the energization of clutch magnet 316 the tape transmitter 261 is initiated into operation to effect transmission to the signal line 233 of the message matter perforated in the previously mentioned loop of tape which contains a perforated record of the sequence in which the stations in the loop circuit are permitted to transmit their particular messages, such as weather data, over the line. However, before station identification signals are transmitted from the unit 235 to bring in the way stations, general data pertaining to circuit, date, time, etc. (contained in the loop of tape) is transmitted from the master control station. Following the transmission of the general data (such as the "sequence collection heading" group of codes) the conditioning and station identification codes are transmitted.

As mentioned hereinbefore, the first code combination transmitted in the conditioning code is the carriage return code signal. As the carriage return signal is transmitted over the line 233 it actuates the line relay 241 in accordance with the marking and spacing impulses of the signal, in well known manner, to vibrate the armature 248 accordingly. As the armature 248 vibrates, the selector magnet 31 of the master control unit (shown in Figs. 1 to 4) responds and controls the selection of bars 59 to close contacts 82. The contacts 82 are represented in Fig. 8 by the numerics 321 to 326, inclusive. Contact 321 is closed in response to an upper case carriage return signal. Contact 322 closes in response to a "letters" signal, and contact 323 closes in response to a "figures" or upper case shift signal. Contact 324 is closed in response to a lower case carriage return signal, and contact 325 is normally closed and opens in response to a "space" signal. Contact 326 is a universal contact and closes in response to all signals.

When the lower case carriage return code signal is impressed on the signal line 233 it not only affects the control apparatus located at the way stations in the manner hereinafter explained, but it also causes the selective operation of an operating bar 93 in the master control station apparatus to close the contact 324, which upon closing establishes an energizing circuit for relay 327 from battery 328, through contact 324 (now closed), contact 275 (now closed) of relay 272, over conductor 329, through contact 331 (now closed) of relay 332, then through the winding of relay 327 to ground. Relay 327 upon energization, operates its armatures to close the contact 333 and open the contacts 334 and 335. The closing of contact 333 completes an energizing circuit for relay 336 from battery 337, through contact 333 and through the winding of relay 336 to ground. Relay 336 upon energizing, operates its armatures to close contacts 338, 339, and 341. The closing of contact 338 provides a locking circuit for relay 336 from battery 330, through contacts 340 and 338, and then through the winding of relay 336 to ground.

Since contact 324 is closed only momentarily (that is, for one cycle of operation of the apparatus shown in Fig. 1 to 4), the relay 327 is operated for a corresponding period of time, whereupon it becomes de-energized to open its contact 333 and to close its contacts 334 and 335. Under this condition of operation a circuit is completed for energizing relay 332, from battery 342, through contact 341 (now closed) of relay 336, through contact 335 (now closed) of relay 327, then through the winding of relay 332 to ground.

As previously indicated, the second code combination of the conditioning code is also a carriage return code signal. Therefore, upon receipt of the second lower case carriage return signal the contact 324 will be again closed momentarily, but this time, owing to the energized condition of relay 332, the circuit from battery 328 will extend through contacts 324 and 275, over conductor 329, then through contact 343 (now closed) of relay 332 (now operated), over conductor 344 and through the winding of relay 284 to ground. By operating relay 284, contacts 283 and 345 thereof are opened. The opening of contact 283 causes the previously traced locking circuit for relay 272 to be opened, thereby permitting all of the armatures of relay 272 to be released. Relay 284 will only be operated momentarily, or as long as contact 324 is held closed during the cyclic operation of the master control unit.

Next the "letters" signal code combination will be sensed by the tape transmitter 235 to impress the "letters" signal on the signal line, and since the signal impulses control the selector magnet 31 of the master control unit, the operating bar 91 associated with the universal contact 326 will be actuated to close the contact 326. At this point, it is understood that the universal contact 326 closes in response to all signals, and although the "letters" signal is at this time impressed on the signal line 233 to achieve the closing of the "letters" contact 322, such closing of contact 322 has no effect. When the universal contact 326 is thus closed, a circuit will be completed to energize the relay 346 from battery 328, over conductors 347 and 350, through contact 326, then through contact 348 (now closed) of relay 304, over conductor 349, through contact 345 (now closed) of relay 284, over conductor 351, through contact 334 (now closed) of relay 327, through contact 339 (now closed) of relay 336, then through the winding of relay 346 to ground. The energization of relay 346 opens contact 340 to break the previously described locking circuit for relay 336, which upon de-energization causes contact 341 to open to break the energizing circuit for relay 332.

The next signal codes to be transmitted by the transmitting unit 235 are the station identification code signals, which may consist of any number, preferably three. These code signals have no further effect on the master control unit or the circuit shown in Fig. 8, but they together with the conditioning code signals just referred to (C. R., C. R., "letters") effect the operation of the ratchet assembly 181 of the way station apparatus to close the contact 213 the effect of which will hereinafter appear.

Following the transmission of the station identification code signals, a "space" signal is impressed on the signal line, the effect of which is to operate the bars 94 to open contact 325 (which is normally closed) to break the previously traced locking circuit for the primary control relay 306, which in turn by releasing its armature 309 breaks the energizing circuit for the clutch magnet 316 of transmitter 235, thereby stopping transmission. The transmitter 235 remains in the stop position or condition pending the control or seizure of the signal line 233 by the control unit located at the selected way station, in a manner now to be described.

Relay 272 is a conditioning relay, since it conditions the master control station circuit for transmission of the "sequence collection heading" group of codes, and the way station selecting and conditioning codes. As previously indicated, relay 272 pulls up while the "sequence collection heading" is transmitted (which includes pertinent information as to the identification of the central or master station, circuit of origin number, date and time, etc.), after which relay 272 releases and then renders the system acceptable for the space contact 325 to be opened to release relay 306, which in turn removes or breaks the energizing circuit for the clutch magnet 316 of the tape transmitter 235. As previously mentioned, the space code signal also appears a few times in the "sequence collection heading" group of codes. To prevent the space signals from at that time disturbing the relay 306, a by-pass is provided to maintain relay 306 energized so long as relay 272 remains energized. This by-pass circuit for maintaining relay 306 energized extends from battery 328, over conductors 347 and 350, through contact 277 of relay 272, over conductor 319, through contact 314 of relay 306, over conductor 310, then through the winding of relay 306 to ground.

Having reference to Fig. 9, the signal line 233 is looped through selector magnet 131 of the controlling selector unit or control unit 370 and the stop contact 361 of the transmitting contacts 362 of transmitter 380. As previously described, the conditioning code signals; namely, carriage return, carriage return, "letters," A, B, C (station identification) "space" affect the selector magnet 131 to select the bars 191 to 197, inclusive, sequentially to step the ratchet assembly to the position where arm 211 closes the contact 213. Prior to the reception of the conditioning code signals just described, the contact key 363 is depressed at the hour when it has been predetermined that weather information collection shall proceed. It was further described hereinbefore, that at each way station, a tape has been previously prepared containing the weather or other information, which tape has been inserted in the transmitter 380, and shortly before the appointed time when sequential collection is to begin, the key 363 is operated to close contacts 364 and 365 to establish a circuit from battery 366, through contacts 364 and 365 of key 363, over conductor 367, and through the winding of relay 368 to ground.

As relay 368 becomes energized, it pulls up its armatures to open contact 369, and to close contacts 371, 372, and 373. Relay 368 becomes locked up over a circuit extending from ground through the winding of relay 368, then through contact 372 (now closed) over conductor 374, through contact 375 (now closed), over conductor 376, through normally closed key 377 to battery 378. The function of key 377 is to de-energize relay 368 should it be desired to revert from automatic to manual operation. Following the operation of relay 368, the lamp 379 will become illuminated to evidence the condition of the way station apparatus preparatory to sequential collection of information. The circuit for lamp 379 extends from battery 366, through lamp 379, through contact 371 (now closed), to ground. Such is the waiting condition of the system at the way station.

Now, when sequential collection has started and the previously indicated conditioning code signals are transmitted, the selector magnet 131 will control the mechanism shown in Figs. 5 to 7 and 11 in the manner previously described, to select successively the bars 191 to 197 to operate the ratchet assembly 181 of the particular way station selected to cause the arm 211 to close the contact 213 thereat. With contact 213 closed and locked, a circuit is established from battery 381, through contact 213, through contact 373 (now closed), over conductor 382 then through the winding of relay 383 to ground. Since the contact 213 is latched closed by the lever 214, a locking circuit for relay 383 is completed from ground, through the winding of relay 383, through contact 384 (now closed) over conductor 385, through contact 213 to battery 381.

The energization of relay 383 also completes an energizing circuit for relay 386 from ground, through the winding of relay 386, through contact 387 (now closed), over conductor 385, through contact 213 to battery 381. Relay 386 upon energizing closes contacts 389 and opens contacts 388 and 375. The opening of contact 375 breaks the locking circuit for relay 368. Lamp 379 remains illuminated even when relay 368 is de-energized because of the ground at closed contact 390. Upon the closure of contact 389, a circuit is established for energizing the clutch magnet 391 of the tape transmitter 380 over an obvious circuit. As previously mentioned, the tape containing the weather (or other) information has been inserted in the transmitter 380, so that upon the conditioning of the way station equipment exemplified in Fig. 9, the message will be transmitted from the way station to the master control station. The receiving printer at the master control station is exemplified by the numeric 392.

At the conclusion of message transmission at the way station, an end-of-message signal is transmitted comprising the following code signal combinations: "Figures," "carriage return" and "letters." These code signals are perforated in the tape following the regular message, and are impressed on the line to perform a dual function. First, as the signals pass through the selector magnet of the unit 237 at the way station, the bar 217 is selectively operated to depress bar 218 to unlatch pawl 214 from the contact 213, thereby permitting the contact 213 to open, to restore the way station circuit and apparatus to normal. In this process, the lamp 379 is extinguished, and the lamp 393 is illuminated over the circuit extending from battery 378, through lamp 393, through contact 388 (now closed), through contact 369 (now closed), to ground.

Secondly, the end-of-message code signals will affect the circuit at the master control station (Fig. 8) in the following manner. It will be recalled that relays 252, 255, and 246 are still energized. Upon receipt of the "figures" code signal, a bar 92 will be selected to close contact 323, whereupon an energizing circuit will be completed for relay 327 extending from battery 328, through contact 323 (now closed), over conductor 394, through contact 279, over conductor 395, through contact 396, then through the winding of relay 327 to ground. Relay 327 upon operating will close a circuit to energize relay 336 from battery 337, through contact 333, through the winding of relay 336 to ground. Relay 336 will become locked up over a circuit extending from battery 330, through contact 340, through contact 338 (now closed), through the winding of relay 336 to ground.

Upon receipt of the "carriage return" signal, both contact 326, which is the universal contact, and contact 321, which is the upper case carriage return signal will close. The closure of the universal contact 326 will complete an energizing circuit for relay 346 extending from battery 328, through contact 326 (now closed), through contact 348, over conductor 349, through contact 345, over conductor 351, through contact 334, through contact 339 (now closed), then through the winding of relay 346 to ground. Relay 346 upon energizing, opens its contact 340 to break the previously described locking circuit for relay 336, which upon de-energization opens the circuit for relay 332.

The closure of the upper case carriage return contact 321 establishes an energizing circuit for a secondary control relay 397, which extends from ground, through the winding of relay 397, over conductor 398, through contact 321 (now closed), over conductors 399, 401, and 402, through contact 403, (now closed), over conductor 404, through contact 295 (now closed) to battery 273. Relay 397 becomes locked up over substantially the same circuit, except the contact 321 is bypassed since the circuit now extends from ground, through the winding of relay 397, then through contact 405 (now closed), through contact 313, over conductor 406 to conductor 401, thence over the previously traced circuit to battery 273.

Upon receipt of the last of the end-of-message code signals, namely, "letters," the contact 322 will be closed by the selective operation of a bar 95. When contact 322 is closed, a circuit will be completed from ground, through the winding of relay 306, then through contacts 407 and 322 (both closed), over conductors 408 and 399, and then over conductor 401 and the circuit previously traced to battery 273. Relay 306 will become energized and in so doing will close its contacts 312 and 314, and open its contacts 313 and 315. Upon the closure of contact 314 the relay 306 will become locked up over the circuit extending from ground, through the winding of relay 306, through contact 314, over conductors 319 and 320, through contact 325 (normally closed) to battery 328. Upon the opening of contact 313 the locking circuit for relay 397 will be broken. Also, when the contact 312 closes, the circuit will again be completed for the clutch magnet 316 of the transmitter 235 from ground, through the winding of magnet 316, over conductor 318, through contact 312, over armature 300 of relay 306, to juncture 317, then over conductors 311 and 310, through contact 314, over conductors 319 and 320, through normally closed contact 325 to battery 328.

Thus, it is observed that in response to the end-of-message code signal group the central or master control station is activated to thereby transmit the conditioning and station identification code signal combinations to the next desired way station to be called in or selected. It will also be recalled that the order or sequence in which the way stations are called in is contained in a continuous loop of perforated tape. As the transmitter 235 is thus operated, the relays illustrated in Fig. 9 are again actuated in the order and manner previously described.

In the event that the selected or called way station fails to respond to the call of the master control station, or in case the way station just terminating its message transmission fails to send an end-of-message group of signals, provision is made for both of these eventualities by providing in the circuit arrangement shown in Fig. 8, an auxiliary transmitting means comprising an additional line relay 410, a series of relays 411, 412, 413, and 414, and an auxiliary transmitter 415. A prerequisite to the activation of the master control station circuit in both of these eventualities is the presence of a time delay of three seconds, wherein the signal line 233 remains in a marking condition so that relay 411, which is a slow-to-operate relay, will be given time to operate, or the way station will be given time to respond.

During the three second delay period, the line circuit extends through line relay 410 over the circuit extending from the "in" side of the line 233, through the winding of line relay 241, over conductor 242, through contact 243, through contact 293 (now closed), over conductor 416, through the winding 410, through the stop contact of transmitting contacts 261, over conductor 417, through the stop contact of the set of transmitting contacts 418, over conductor 419 to junction 421, then over conductor 422, then to the "out" side of the signal line. With sustained marking current on the signal line 233, the armature 423 of line relay 410 will remain on the marking contact 424 to establish an energizing circuit for slow-to-operate relay 411, extending from source of alternating current 425, over conductor 426, through the winding of relay 411, over conductor 427, through contact 424, through armature 423, over conductor 428, through contact 294 (now closed), and over conductor 429 back to the alternating current source 425.

When relay 411 has operated after the three second delay it pulls up its armature 431 to close its contact 432 to complete a circuit for relay 412 from ground, through the right-hand winding of relay 412, over conductor 433, through contact 432 (now closed), over conductor 434, through normally closed timing contact 435, over conductors 436 and 402, through contact 403 (now closed), over conductor 404, through contact 295 (now closed) to battery 273. Relay 412 upon energization opens its contact 437, and closes its contacts 438, 439, 441, 442, and 443. Upon the closure of contact 443 a circuit is completed to energize the clutch magnet 444 of the transmitter 415, which circuit extends from ground, through the winding of magnet 444, over conductor 445, through contact 443 (now closed) to battery 446. Clutch magnet 444 upon operation initiates the operation of the set of contacts 418 to transmit the code signals controlled by code signal controlling relays 412, 413, and 414.

According to the present invention, the relays 412, 413, and 414 control the transmission of the "figures," "carriage return" and "letters" code signal combinations, respectively. As the contacts 418 are operated successively or sequentially and when the contact 439 of relay 412 is closed, the "figures" code signal is transmitted over the signal line 233, over the circuit extending from the "in" side of the signal line 233, through the winding of line relay 241, over conductor 242, through contact 243, through contact 293 (now closed), over conductor 416, through line relay 410, through the stop contact of the set of transmitting contacts 261, over conductor 417, through the set of contacts 418, over conductors 447, then through contact 439 (now closed), over conductor 422, to the "out" side of the signal line 233. It is observed that the conductors 447 are strapped or connected to the contact 439 in accordance with the "figures" signal; that is, to the first, second, fourth, and fifth wires of the group of conductors 447.

As the set of contacts 418 were operated sequentially, the timing contact 435 was also opened momentarily during the cycle to open the original energizing circuit for relay 412, which, however, was locked up over the circuit extending from ground, through the right-hand winding of relay 412, then through contact 441 (now closed) of relay 412, over conductor 448, through contact 449 to battery 451.

The transmission of the "figures" signal will have the effect of operating the figure shift bar 87 in the apparatus shown in Figs. 1 to 4, preparatory to the selection of the upper case carriage return bar 96. As long as relay 412 is locked up, its contact 443 maintains the circuit for clutch magnet 444 established so that the contact operating shaft of the transmitter 415 will continue to rotate. However, during the cycle of transmission of the "figures" signal as just described, the contact 424 of line relay 410 has been opened (due to vibration thereof in response to code impulsing) to thereby open the previously established energizing circuit for slow-to-operate relay 411. Contact 432 of relay 411 will have been opened and consequently contact 452 thereof will be closed. The closing of contact 452 will establish a circuit for relay 413 from ground, through the winding of relay 413, over conductor 453, through contact 442 (now closed), over conductor 454, through contact 452, through armature 431, over conductor 434, through timing contact 435, over conductors 436 and 402, through contact 403, over conductor 404, through contact 295 (now closed) to battery 273. The relay 413 is energized after the transmission of the "figures" code signal to prepare the circuit for the succeeding transmission of the "carriage return" code signal.

Relay 413 upon energization, becomes locked up over the circuit extending from ground, through the winding of relay 413, through contact 455 (now closed), over conductor 456, through contact 457 to battery 458. The battery 451 now supplies current for the clutch magnet 444 of transmitter 415 from battery 451, through contact 459 (now closed), over conductors 461 and 445, through the winding of magnet 444 to ground. The previously described locking circuit for relay 412 is broken upon the opening of contact 449 of relay 413. However, relay 412 is maintained locked up over a circuit which extends from ground, through the left-hand winding of relay 412, through contact 438 (still closed), over conductor 467, through timing contact 435 (now closed), over conductors 436 and 402, through contact 403, over conductor 404, through contact 295, to battery 273, so that relay 414 will not become energized too soon; which it would do if relay 412 were permitted to become de-energized to close its contact 437. Thus, the releasing of relay 412 is governed, not only by contact 449, but also by the timing contact 435. In this manner, relay 414 will not become energized until the close of the following cycle, after the carriage return code signal, governed by tap 463 under the control of relay 413, has been transmitted. Therefore, while the contacts 418 are being operated sequentially to transmit the carriage return code signal, the contact 435 will be open and the relay 412 will become de-energized, to effect the closing of contact 438 to prepare the energizing circuit for relay 414.

As the contact operating shaft of unit 415 continues to rotate, the contacts 418 thereof are again actuated sequentially to transmit through the now closed contact 462 of relay 413 the "carriage return" code signal. It is observed that the contact 462 is connected at 463 to only the fourth conductor of the set of conductors 447, and that the contact 462 is connected to the signal line 233 over the afore-mentioned conductor 422. In response to the "carriage return" signal, the contact 321 is closed momentarily to effect the energization of relay 397 as hereinbefore described, preparatory to the establishment of a circuit for clutch magnet 316 of the principal transmitter 235, to effect the transmission of the conditioning and station identification code signals pertaining to the next way station to be selected in the collection sequence. In this preparation, the contact 407 of relay 397 will close and relay 397 will become locked up. The contact 407 prepares an energizing current for relay 306, which will be energized, as will presently appear, when contact 322 is closed in response to a "letters" signal transmitted under the control of relay 414.

When the timing contact 435 is closed during the next signal cycle of unit 415, a circuit for relay 414 is completed from ground, through the winding of relay 414, over conductor 464, through contact 465 (now closed), over conductor 466, through contact 437, over conductor 467, through timing contact 435, over conductors 436 and 402, through contact 403, over conductor 404, through contact 295, to battery 273. Relay 414 upon energization closes its contacts 469 and 471, and opens contacts 457. Upon the opening of contact 457, the locking circuit for relay 413 will be broken, whereupon contact 459 thereof will open to break the circuit for clutch magnet 444. Thereupon, the contact operating shaft of the transmitter 415 will make one more cyclic rotation to transmit the "letters" code combination as determined by the connection between conductors 447 and contact 469 of relay 414.

As the "letters" code signal is thus transmitted over the signal line 233, it will cause the "letters" operating bar 95 to be selected in the unit 234 to establish an energizing circuit through contact 322 (and contact 407 of relay 397) for relay 306, whereupon contact 312 of relay 306 will be closed, and the circuit previously described for energizing clutch magnet 316 of unit 235 will be completed. The unit 415 will now cease transmission, and the unit 235 will begin transmitting from the loop of tape, the conditioning codes and station identification code signals pertaining to the next way station.

After all of the way stations in the loop circuit have been selected and their respective messages transmitted to the master control station 231 and recorded on the printer 392, a shutdown signal (perforated in the loop of tape in unit 235) will be transmitted, the effect of which will now be described. The shutdown signal, according to the present embodiment of the invention comprises the "figures," "figures," and "letters" code signals. After the end-of-message signal from the last way station has been received and the tape transmitter 235 has been initiated into operation in response thereto, a "figures" code signal will be transmitted, the effect of which is to close the contact 323 to establish an energizing circuit for relay 327 from battery 328, through contact 323 (now closed), over conductor 394, through contact 279, over conductor 395, through contact 396 of relay 332, then through the winding of relay 327 to ground. Relay 327 upon energization will close its contact 333 to complete a circuit for relay 336 from battery 337, through contact 333, through the winding of relay 336 to ground. Since the contact 323 is closed only momentarily, the relay 327 will only be energized for the same period. Therefore, an energizing circuit for relay 332 will be completed from battery 342, through contact 341 (now closed), through contact 335, through the winding of relay 332 to ground.

Upon receipt of the second successive "figures" code signal, the contact 323 will again be closed momentarily to complete a circuit for energization of relay 304 from battery 328, through contact 323, over conductor 394, through contact 279, over conductor 395, through contact 472, over conductors 473 and 474 and through the winding of relay 304 to ground. Relay 304 upon energization opens its contacts 303 and 348. The opening of contact 303 breaks the afore-described locking circuit for relay 246. Relay 304 is, of course, energized only momentarily, or during the period that contact 323 is closed in response to the "figures" code signal.

The last code signal of the "shutdown" code group is a "letters" code signal, and when this signal is received, both the "universal" contact 326 and the "letters" contact 322 are closed. The closing of the contact 322, however, has no effect in this instance, but the closing of contact 326 will cause relay 346 to become energized over a circuit extending from ground through the winding of relay 346, through contact 339 (now closed) of relay 336, through contact 334 of relay 327, over conductor 351, through contact 345 of relay 284, over conductor 349, through contact 348 of relay 304, through "universal" contact 326, and over conductor 347 to battery 328. When the relay 346 becomes energized its contact 340 is opened to break the afore-described locking circuit for relay 336. The de-energization of relay 336 causes its contact 341 to open to break the locking circuit for relay 332. Relay 346 will, of course, remain energized only momentarily, or for the period of operation of contact 326. Since upon termination of transmission the signal line condition is marking, or current on the line, the armature 248 of line relay 241 will be held against contact 249, and therefore, because contact 251 of line relay 241 is held open the circuit for relay 252 is opened whereupon relay 252, which is slow to release, will finally become de-energized, and relay 255 will remain energized preparatory to the next sequential collection of weather (or other information) pursuant to the operation of key 263. By the use of the key 301 the master control station may be shut down at any time, because when the key 301 is depressed, the contacts associated therewith are opened, thereby breaking the locking circuit for relay 246.

A lamp 475 and a bell 476 are provided to indicate an open line condition. As previously described, in response to an open line condition, the relay 252 becomes energized and the relay 255 becomes de-energized, whereby contact 477 of relay 255 is closed to complete an energizing circuit for bell 476 and lamp 475 which extends from battery 478, through contact 477, over conductor 479, through contact 281 (now closed as previously described) of relay 272, through the winding of the operating coil of bell 476 and lamp 475 (in parallel) to ground.

Although specific embodiments of the invention have been shown in the drawings and described in the accompanying specification, it is to be understood that this invention is not limited to such specific embodiments but is capable of modification and rearrangement without departing from the spirit or scope of the appended claims.

What is claimed is:

1. In a telegraph system, a primary station, a plurality of secondary stations serially connected to said primary station, means at said primary station for transmitting groups of signals identifying connected secondary stations for rendering said secondary stations effective selectively in a predetermined sequential order to transmit messages to said primary station, relay means at each secondary station for conditioning said station for automatic response to said groups of signals transmitted from said primary station, mechanical selection means at each secondary station comprising a rotary contact operating device and selectable members responsive to groups of signals transmitted from said primary station, whereby said selectable members when operated in a predetermined order are effective to read said transmitted groups of signals to actuate said rotary contact operating device to effectuate transmission from said secondary station according to the group of signals identified therewith.

2. In a telegraph system, a primary station, a sequential control means at said station, a plurality of secondary stations serially connected to said primary station, a combination mechanical selector and relay means at said primary station operable in conjunction with said sequential control means for transmitting groups of signals identifying connected secondary stations for rendering said secondary stations effective selectively in a predetermined sequential order to transmit messages to said primary station, relay means at each secondary station for conditioning said station for automatic response to said groups of signals transmitted from said primary station, and mechanical selector means at each secondary station comprising a rotary contact operating device and selectable members responsive to groups of signals transmitted from said primary station, whereby said selectable members when operated in a predetermined order are effective to read said transmitted groups of signals to actuate said rotary contact operating device to effectuate transmission from the secondary station according to the group of signals identified therewith 3. In a telegraph system, a primary station, a plurality of secondary stations serially connected to said primary station, means at said primary station for transmitting groups of signals identifying connected secondary stations for rendering said secondary stations effective selectively in a predetermined sequential order to transmit messages to said primary station, relay means at each secondary station for conditioning said station for automatic response to said groups of signals transmitted from said primary station, and mechanical selector means at each secondary station comprising selectable members responsive to said groups of signals transmitted from said primary station, a contact, and rotatable contact operating means, whereby said selectable members upon being operated in predetermined order are effective when said secondary station is conditioned by said relay means to read said transmitted groups of signals to rotate said contact operating means to close said contact to effectuate through said relay means transmission from the secondary station according to the group of signals identified therewith.

4. In a telegraph system, a normally closed signal line, a central station and a plurality of way stations connected to said signal line, a pair of line controlled relays at said central station, transmitting means at said central station for transmitting over said signal line groups of code signals for controlling transmission of messages from said way stations to said central station in a predetermined sequential order, a receiving selector means at each of said way stations responsive to said groups of code signals to condition and select said way stations in said predetermined sequential order, a transmitter initiating means at said central station, relay means at said central station responsive to the operation of said line controlled relays comprising a primary control relay and a secondary control relay to render said transmitting means effective to transmit said groups of code signals, said primary control relay cooperable with one relay of said pair of relays to control the initiation of operation of said transmitting means in response to the actuation of said initiating means, a master control unit at said central station, means in said master control unit responsive to a code signal of said group of code signals to terminate operation of said transmitting means, and further means in said unit responsive to predetermined conditioning code signals indicative of message termination received from the way station then transmitting, said means cooperable with the other relay of said pair of relays to operate said secondary control relay to reinitiate under the control of said primary control relay the operation of said transmitting means.

5. In a telegraph system, a signal line, a primary station, a plurality of secondary stations serially associated with said primary station on said line, dual relay means responsive to the condition of said signal line, master control means including said dual relay means for rendering said secondary stations effective selectively in a predetermined sequential order to transmit messages to said primary station, means at each of said secondary stations responsive to groups of signals transmitted from said primary station to read said transmitted signals to condition a secondary station for transmission according to the group identified therewith, means at said primary station responsive to a group of conditioning codes indicative of message termination from said secondary stations to control the operation of said master control means, and an auxiliary transmitting means comprising an auxiliary line relay for recognizing the absence of said conditioning codes, a time delay means controlled by said auxiliary line relay, a plurality of code controlling relays, an auxiliary transmitter associated with said relays, and a timing contact in said transmitter, whereby in response to a predetermined time delay said auxiliary transmitter is initiated into operation to automatically insert under the control of said code controlling relays and said timing contact a group of said conditioning codes.

GEORGE G. KEYES.

REFERENCES CITED

The following references are of record in the file of this patent:

UNITED STATES PATENTS

| Number | Name | Date |
|---|---|---|
| 1,870,997 | Jipp et al. | Aug. 9, 1932 |
| 1,943,475 | Gurley | Jan. 16, 1934 |
| 2,336,373 | Starr et al. | Dec. 7, 1943 |
| 2,366,733 | Krecek | Jan. 9, 1945 |
| 2,381,871 | Bacon | Aug. 14, 1945 |
| 2,430,447 | Branson | Nov. 11, 1947 |